(12) United States Patent
Bellenger

(10) Patent No.: US 12,015,964 B2
(45) Date of Patent: Jun. 18, 2024

(54) METHOD AND SYSTEM FOR LOCATION-BASED RESOURCE ACCESS

(71) Applicant: Visa International Service Association, San Francisco, CA (US)

(72) Inventor: Thomas Bellenger, San Mateo, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

(21) Appl. No.: 17/524,622

(22) Filed: Nov. 11, 2021

(65) Prior Publication Data

US 2022/0070617 A1 Mar. 3, 2022

Related U.S. Application Data

(63) Continuation of application No. 16/640,013, filed as application No. PCT/US2017/053555 on Sep. 26, 2017, now Pat. No. 11,202,166.

(51) Int. Cl.
*H04W 4/02* (2018.01)
*H04W 4/80* (2018.01)
(Continued)

(52) U.S. Cl.
CPC .......... *H04W 4/023* (2013.01); *H04W 4/025* (2013.01); *H04W 4/80* (2018.02); *H04W 76/14* (2018.02); *H04W 12/63* (2021.01)

(58) Field of Classification Search
CPC ....... H04W 4/023; H04W 76/14; H04W 4/80; H04W 4/025; H04W 12/63
See application file for complete search history.

(56) References Cited

U.S. PATENT DOCUMENTS 8,478,692 B2 7/2013 Carlson et al.
8,646,060 B1* 2/2014 Ben Ayed ............... H04W 4/20
726/9

(Continued)

FOREIGN PATENT DOCUMENTS

EP 3035269 A1 6/2016
JP 2005223436 A 8/2005
WO 2016182308 A1 11/2016

OTHER PUBLICATIONS

Francis et al., "Practical NFC Peer-to-Peer Relay Attack Using Mobile Phones", RFIDSec, Radio Frequency Identification: Security and Privacy Issues, Jan. 2010, pp. 35-49.

(Continued)

*Primary Examiner* — Steven S Kelley
(74) *Attorney, Agent, or Firm* — Kilpatrick Townsend & Stockton LLP

(57) ABSTRACT

A method is disclosed. The method includes establishing, by a first device, a wireless connection to a second device; transmitting a request, by the first device and to the second device, for location data indicative of a location of the second device; receiving, by the first device and from the second device, the location data indicative of the location of the second device; determining, by the first device, a distance between the first device and the second device based at least in part on the received location data; generating, by the first device, an altered value based on the received location data and the determined distance; and transmitting, by the first device and to the second device, the altered value and an account identifier associated with a user of the first device.

17 Claims, 7 Drawing Sheets

(51) Int. Cl.
*H04W 12/63* (2021.01)
*H04W 76/14* (2018.01)

(56) References Cited

U.S. PATENT DOCUMENTS

| | | | | |
|---|---|---|---|---|
| 8,761,809 | B2* | 6/2014 | Faith | G06Q 20/389 |
| | | | | 455/406 |
| 9,721,250 | B2 | 8/2017 | Hammad et al. | |
| 9,852,416 | B2* | 12/2017 | Mahaffey | G06Q 20/40 |
| 9,892,402 | B2* | 2/2018 | Sharma | G06Q 20/12 |
| 9,922,316 | B2* | 3/2018 | Moon | G06Q 20/3223 |
| 9,972,005 | B2 | 5/2018 | Wong et al. | |
| 10,332,192 | B2 | 6/2019 | Zolotov | |
| 10,528,944 | B2* | 1/2020 | Khan | G06Q 20/3278 |
| 11,202,166 | B2* | 12/2021 | Bellenger | H04W 4/025 |
| 11,394,721 | B2* | 7/2022 | Chen | H04L 63/12 |
| 2011/0143711 | A1 | 6/2011 | Hirson et al. | |
| 2012/0246074 | A1 | 9/2012 | Annamalai et al. | |
| 2013/0226800 | A1 | 8/2013 | Patel et al. | |
| 2014/0164761 | A1* | 6/2014 | Kufluk | H04L 9/0872 |
| | | | | 726/4 |
| 2014/0250009 | A1 | 9/2014 | Carlson | |
| 2015/0172920 | A1 | 6/2015 | Ben Ayed | |
| 2015/0291129 | A1 | 10/2015 | Saito | |
| 2015/0371210 | A1 | 12/2015 | Chatterjee et al. | |
| 2016/0239817 | A1 | 8/2016 | Chene | |
| 2016/0292666 | A1 | 10/2016 | Chauhan | |
| 2017/0161723 | A1 | 6/2017 | Hill et al. | |
| 2017/0270528 | A1 | 9/2017 | Prakash et al. | |
| 2018/0034642 | A1* | 2/2018 | Kaehler | H04L 63/0442 |
| 2018/0089663 | A1* | 3/2018 | Chen | G06Q 30/06 |
| 2020/0119919 | A1 | 4/2020 | Park et al. | |

OTHER PUBLICATIONS

Marforio et al., "Smartphones as Practical and Secure Location Verification Tokens for Payments", NDSS Symposium, Feb. 22, 2014, pp. 1-15.

Application No. PCT/US2017/053555, International Search Report and Written Opinion Received, dated Jun. 18, 2018, 11 pages.

U.S. Appl. No. 16/640,013, Final Office Action, dated Apr. 13, 2021, 14 pages.

U.S. Appl. No. 16/640,013, Non-Final Office Action, dated Oct. 15, 2020, 11 pages.

U.S. Appl. No. 16/640,013, Notice of Allowance, dated Aug. 12, 2021, 15 pages.

* cited by examiner

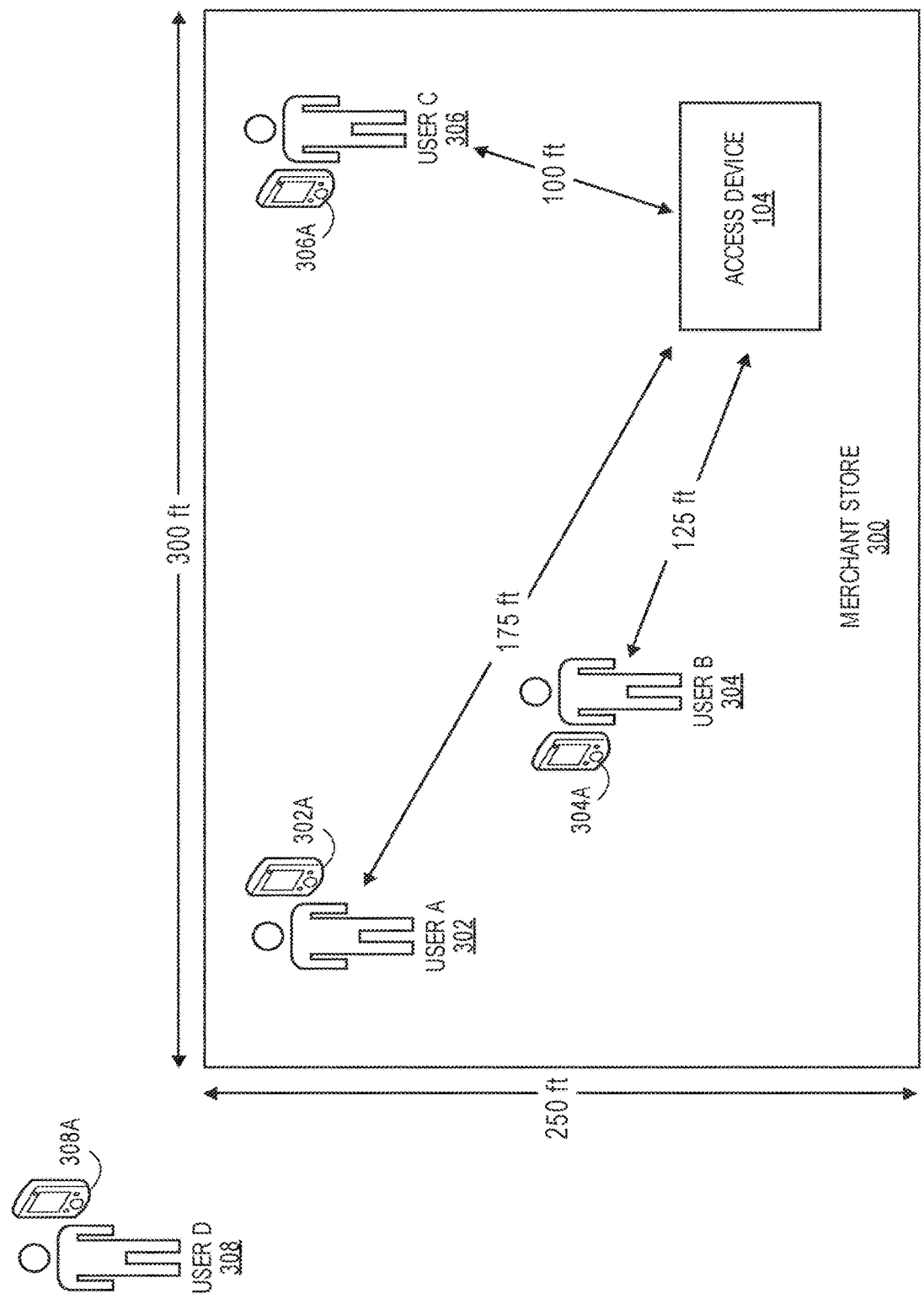

METHOD AND SYSTEM FOR LOCATION-BASED RESOURCE ACCESS

CROSS-REFERENCES TO RELATED APPLICATIONS

This application is a Continuation of U.S. patent application Ser. No. 16/640,013 filed on Feb. 18, 2020 which is a National Stage of International Application No. PCT/US2017/053555, International Filing Date Sep. 26, 2017, which are herein incorporated by reference in their entirety.

BACKGROUND

Relay attacks are possible in contact and contactless access transactions such as payment transactions. For example, FIG. 1 shows a victim's contactless card 40 that may be remotely located relative to a contactless terminal 10 at a resource provider such as a merchant.

Although the contactless card 40 and the contactless terminal 10 are very far apart in this example, an attacker (e.g., one or more people working together to steal information or defraud legitimate users) can use two wireless enabled mobile devices 20, 30, and two mobile applications 20A, 30A on the wireless enabled mobile devices 20, 30 to conduct a relay attack. In a typical relay attack, the attacker uses mobile device A 30 with mobile application A to tap and communicate with the contactless card 40 in the victim's pocket. The attacker can use mobile device B 20 with mobile application B 20A, to tap and communicate with a contactless terminal 10 at a merchant or other resource provider. The two applications 20A, 30A on the two mobile devices 20, 30 are connected through a network, for example the mobile Internet 50.

Command messages issued by the contactless terminal 10 are relayed from mobile device B 20 to mobile device A 30, and are then received by victim's contactless card 40. The victim's contactless card 40 then responds to the command messages. Access information on the card 40 (e.g., payment information such as a primary account number (PAN)) can then be relayed from mobile device A 30 to mobile device B 20, and then to the contactless terminal 10. By performing such a relay attack, the attacker can conduct an access transaction (e.g., a purchase transaction) using the victim's contactless card 40 without taking victim's card 40 from his/her possession. Although this particular example is one which involves a merchant, it is understood that this problem can exist in other situations where access to a resource is desired (e.g., an attempt to access a building, or an attempt to access data inside of a computer).

As shown above, data between two legitimate devices (the contactless terminal 10 and the contactless card 40) are can be compromised.

Embodiments of the invention address these and other problems.

SUMMARY

A system of one or more computers can be configured to perform particular or actions by virtue of having software, firmware, hardware, or a combination of them installed on the system that in operation causes or cause the system to perform the actions. One or more computer programs can include instructions that, when executed by one or more processors in a data processing apparatus, can cause the apparatus to perform the actions. One general aspect includes a method, including establishing, by a first device, a wireless connection to a second device. The method also includes transmitting a request, by the first device and to the second device, for location data indicative of a location of the second device. The method also includes receiving, by the first device and from the second device, the location data indicative of the location of the second device. The method also includes determining, by the first device, a distance between the first device and the second device based at least in part on the received location data. The method also includes generating, by the first device, an altered value based on the received location data and the determined distance. The method also includes transmitting, by the first device and to the second device, the altered value and an account identifier associated with a user of the first device, where the second device transmits the altered value and the account identifier to a server computer, where the server computer analyzes the altered value, and where the server computer allows access to a resource after analyzing the altered value. Other embodiments of this aspect include corresponding computer systems, apparatus, and computer programs recorded on one or more computer storage devices, each configured to perform the actions of the methods.

Implementations may include one or more of the following features. The method may use a wireless connection that is at least one of a Bluetooth low energy (BLE), near field communication (NFC), or Wi-Fi connection. The method may include a process where the first device determines a risk score based at least in part on the determined distance, where the altered value is further based on the risk score, and where the server computer allows access to the resource based at least in part on the risk score. The method may also include location data that includes at least one of global positioning system (GPS), global navigation satellite system (GLONASS), Beido navigation satellite system (BDS), or global navigation satellite system (GNSS) coordinates. The method may also include a process where the first device is a portable device and the second device is an access device. The method also include, in response to establishing the wireless connection to the second device, receiving, by the first device and from the second device, an unpredictable number, where the generated altered value is further based on the unpredictable number.

One general aspect includes a first device, the first device including: a processor; and a non-transitory computer readable medium. The non-transitory computer readable medium includes computer executable code for executing a method. The method may include the first device establishing a wireless connection to a second device. The first device transmits a request, to the second device, for location data indicative of a location of the second device. The first device also receives, from the second device, the location data indicative of the location of the second device. The first device also determines a distance between the first device and the second device based at least in part on the received location data. The first device generates an altered value including the received location data and the determined distance. The First device also transmits, to the second device, the altered value and an account identifier associated with a user of the first device. The second device may transmit the altered value and the account identifier to a server computer, where the server computer analyzes the altered value, and where the server computer allows access to a resource after analyzing the altered value.

One general aspect includes a method, including: receiving, by a server computer and from a first device, an altered value and an account identifier associated with a user of a second device, where the altered value is generated by the second device, and where the altered value is based on location data indicative of a location of the first device and a distance between the first device and the second device determined by the second device. The method also includes analyzing, by the server computer, the altered value. The method also includes allowing, by the server computer, access to a resource after analyzing the altered value.

One general aspect includes a server computer, including: a processor; and a non-transitory computer readable medium, the non-transitory computer readable medium including computer executable code for executing a method. The method includes receiving, from a first device, an encrypted value and an account identifier associated with a user of a second device, where the encrypted value is generated by the second device, and where the encrypted value includes location data indicative of a location of the first device and a distance between the first device and the second device determined by the second device. The server computer can also perform a method including decrypting the encrypted value to obtain the location data and the distance. The server computer can also perform a method including determining if the distance is below a predetermined threshold distance, and then allowing access to a resource. Otherwise if the distance is above a predetermined threshold distance, then denying access to the resource.

BRIEF DESCRIPTION OF THE DRAWINGS

FIG. 3 shows a block diagram of multiple users within a merchant store, according to some embodiments.

DETAILED DESCRIPTION

Figure 1:
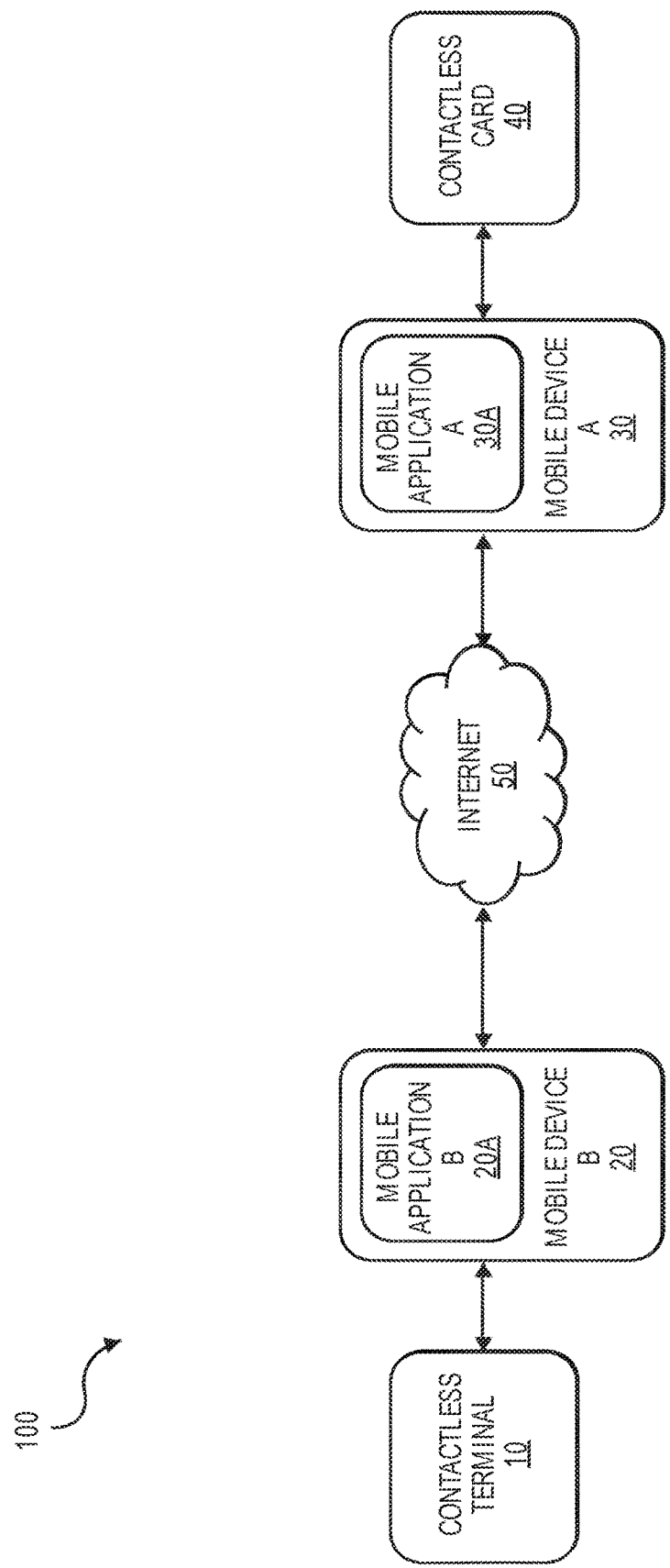
FIG. 1 shows a system diagram illustrating a relay attack.

One embodiment of the invention is directed to a method. The method comprises establishing, by a first device, a connection a second device. The connection may be established using any wireless protocol such as, but not limited to, Bluetooth, Wi-Fi, ZigBee, Z-Wave, or NFC. The connection may be established such that the first device can request permission to access a resource provided by the second device or by a server computer. For example, the connection may be established for a payment transaction between the first device and the second device.

Thereafter, the first device may transmit a request to the second device for location data that indicates the location (e.g., longitude and latitude) of the second device. In response to the second device receiving the request, the second device may provide the requested location data to the first device.

Upon receiving the location data from the second device, the first device may determine a distance between the first device and the second device based on the received location data. The distance may be determined using any known distancing/ranging technique. For example, the first device may determine how far away it is from the second device by calculating a distance (e.g., a straight line distance) using its own known location (e.g., longitude and latitude of the first device) and the location data from the second device.

After the first device determines its distance from the second device, the first device can generate an altered value that is based on the location data received from the second device in addition to the determined distance. The altered value can be, for example, a encrypted value such as a cryptogram or a hashed value. The altered value can then be transmitted, by the first device and to the second device, along with an account identifier associated with a user of the first device. The account identifier can be, for example, a primary account number (PAN).

As described above, the altered value can be either an encrypted value or a hashed value. The encrypted value may include the location data received from the second device in addition to the determined distance in encrypted form. The encrypted value may be decrypted by a server computer using a key to recover the received location data and the determined distance. Alternatively, the hashed value may be a computed hash using a secure hash algorithm on the received location data and the determined distance. While the following example discusses an encrypted value, it can be appreciated that the embodiments described herein also function using a hashed value.

The second device may then forward the encrypted value and the account identifier to a server computer. The server computer can then decrypt the encrypted value to obtain the location data and the determined distance. The server may allow access to the resource requested by the first device if the determined distance is below a predetermined threshold distance. In addition, the server computer may verify that the location data is the location data expected based on the server computer's knowledge of the second device. In other words, the server computer may ensure that the second device is a genuine device and is in fact at the expected location and not elsewhere as it may be if a fraudster were trying to compromise the transaction. For example, if the second device is at the expected location and the distance between the first device and the second device is less than 20 yards, the server computer may allow the first device to access the resource. In some embodiments, instead of directly allowing access to the resource, the server computer may transmit an authorization response to the second device, which may in turn then allow the first device to access the resource.

In an example where the altered value is a hashed value, the server computer, after receiving the hashed value and the account identifier, use location data and distance data received from the first device and the second device to verify the hashed value to determine integrity of the received data. The server computer may then allow access to the resource based on the determination of the data integrity.

The implementation of such mechanisms can eliminate relay attacks attacks by ensuring that the first device is proximate to the second device, and not at some remote location that may have been compromised by a fraudster. The implementations described herein provide the advantage for better risk management and any attacker device that would attempt to circumvent embodiments of the invention would need to be extremely sophisticated if it could be done at all. Embodiments of the invention allow first and second devices (e.g., an access device and a portable device) to communicate wirelessly to conveniently conduct transactions for resources, while reducing or eliminating the possibility or relay attacks.

Prior to discussing embodiments of the invention, descriptions of some terms may be helpful in understanding embodiments of the invention.

A "portable device" may comprise any suitable device that may be carried by a user. Examples of portable devices may include mobile communication devices (e.g., mobile phones), payment devices (e.g., credit cards, debit cards, etc.), user access devices such as access badges, etc. A portable device can store sensitive information such as payment credentials (e.g., primary account numbers, tokens, expiration dates, etc.), and access credentials.

A "mobile communication device" may be an example of a "communication device" that can be easily transported. A mobile communication device may also have remote communication capabilities. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as vehicles such as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. Suitable payment devices can be hand-held and compact so that they can fit into a user's wallet and/or pocket (e.g., pocket-sized). Example payment devices may include smart cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or locations. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer.

An "issuer" may typically refer to a business entity (e.g., a bank) that maintains an account for a user. An issuer may also issue payment credentials stored on a portable device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

An "altered value" may be any value that is altered from or based on original data. For example, an altered value can be an encrypted value that includes original data in encrypted form. The encrypted value can later be decrypted using key to recover the original data. In another example, the altered value can be a hashed value that is computed on the original data using a hashing algorithm (e.g., secure hashing algorithm). A receiver of the original data and the hashed value can verify the integrity of the original data based by computing another hashed value on the original data and comparing it to the received hashed value.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Figure 2A:
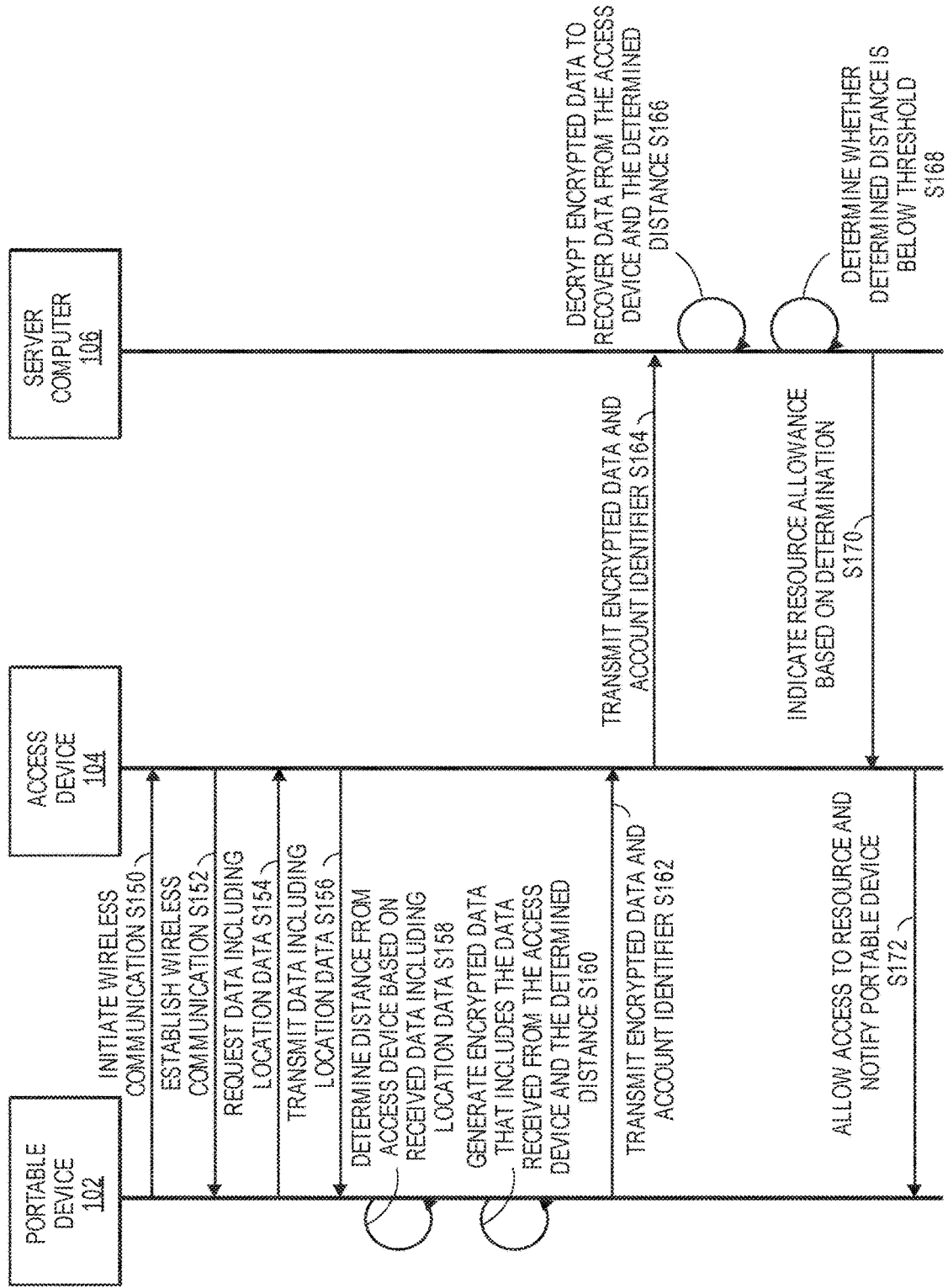
FIG. 2A shows a block diagram of a system including a portable device, an access device, and a server computer, according to some embodiments.

FIG. 2A shows a block diagram of a system including a portable device 102, an access device 104, and a server computer 106. The portable device 102 may be an example of a first device and the access device 104 may be an example of a second device. The portable device 102 may be a mobile device such as a mobile phone or a card, while the access device 104 may be a terminal. In some embodiments, the server computer 106 may operate as a part of payment processing network (PPN).

The portable device 102 and the access device 104 may ordinarily communicate with each other via a direct wireless communication protocol such as NFC (near field communications), Bluetooth™, Bluetooth™ Low Energy (BLE), Wi-Fi, ZigBee, Z-Wave, infrared, etc. Typically, the portable device 102 and the access device 104 may communicate within a range of less than about 100 meters, 50 meters, 10 meters, or 5 meters.

Prior to step S150, the portable device 102 may present a user of the portable device with a user interface (UI) from which the user can select a mobile application for interfacing with the access device 104. For example, the mobile application may be a digital wallet application. At step S150, the portable device 102 may initiate a wireless communication (e.g., using wireless signals) with the access device 104 in order to establish a wireless link between the portable device 102 and the access device 104. For example, the portable device 102 may transmit a link request message to the access device 104 indicating the portable device's 102 desire to establish the link with the access device 104. The portable device 102 may be able to scan for the access device 104 as the access device 104 may continuously broadcast a message indicating its availability.

At step S152, after the portable device 102 initiates the wireless communication with the access device 104, the access device 104 may establish the wireless communication link with the portable device 102 according to the specific wireless protocol being used. For example, assuming other parameters are satisfied and the access device 104 accepts the portable device 102 as a trusted device to establish the wireless communication link with, the access device 104 may transmit a wireless link approval message to the portable device 102. The portable device 102 and the access device 104 may engage in a handshake to establish the wireless communication link.

At step S154, after the wireless communication link has been established between the portable device 102 and the access device 104, the portable device 102 may request data from the access device 104. This data may include data typically requested from an access device 104 during a typical debit or credit card (or device) transaction. For example, the portable device 102 may request a random or unpredictable number, the current time and date, the name of the merchant associated with the access device 104, etc. from the access device 104. The requested data may be defined by tags added to a Processing Options Data Object List (PDOL) that is sent to the access device 104. In addition to the data described above, the portable device 102 may also request, from the access device 104, location data indicative of the access device's 104 physical location. For example, the location data may include satellite coordinates (latitude and longitude) of the access device 104. The coordinates may be one of Global Positioning System (GPS), Global Navigation Satellite System (GLONASS), BeiDoü Navigation Satellite System (BDS), or Global Navigation Satellite System (GNSS) coordinates.

At step S156, after the portable device 102 requests the data (including the location data) from the access device 104, the access device 104 may transmit the requested data (including the location data) to the portable device 102 via the established wireless communication link. At step S158, upon receiving the requested data (including the location data) from the access device 104, the portable device 102 may determine its distance from the access device 104 based on the received location data. The determination of the distance between the portable device 102 and the access device 104 may be accomplished using any known distance determination or ranging technique. For example, the portable device 102 may initiate a location determination command locally to determine its own location via a satellite positioning chip local to the portable device 102. Upon determining its own location (e.g., longitude and latitude coordinates), the portable device 102 may determine its distance from the access device 104 using its own local coordinates and the access device's 104 coordinates received as part of the requested location data. For example, the portable device 102 may determine that it is 50 feet away from the access device 104 based on the location coordinates of both devices.

At step S160, after the portable device 102 determines its distance from the access device 104, the portable device 102 may generate encrypted data that includes the data (including the location data) received from the access device in step S154 and the determined distance from the access device 104 determined in step S158. For example, the encrypted data can include the random or unpredictable number, the current time and date, the name of the merchant associated with the access device 104, the location data provided by the access device 104 to the portable device 102 in step S156, and the determined distance from the access device 104 determined in step S158, all in encrypted form. One or more of these pieces of data may be concatenated and then encrypted to form the encrypted value. In some embodiments, the encrypted data may be a cryptogram. To produce the encrypted value, the portable device 102 may have been pre-provisioned with a symmetric key, or may derive a symmetric key that can be used to encrypt the data. Alternatively, the portable device 102 may receive a public key from the server computer 106 or some other entity and the corresponding private key may be held by the server computer 106. The portable device 102 may use the public key to encrypt the data and the server computer 106 may use the corresponding private key to decrypt the encrypted data. Any suitable encryption/decryption process may be used including DES, triple DES, AES, ECC, etc.

At step S162, after the portable device 102 generates the encrypted data, the portable device 102 may transmit the encrypted data along with an account identifier to the access device 104 via the wireless communication link. The account identifier may be an account identifier of a user account associated with a user of the portable device 102. For example, the account identifier may be a Primary Account Number (PAN).

At step S164, after the portable device 102 transmits the encrypted data along with the account identifier to the access device 104, the access device 104 may forward the received encrypted data along with the account identifier to the server computer 106. In some embodiments, the server computer 106 may operate within a payment processing network (PPN).

At step S166, after the server computer 106 receives the encrypted data along with the account identifier from the access device 104, the server computer 106 may decrypt the encrypted data to recover the original data. The original data may include the random or unpredictable number, the current time and date, the name of the merchant associated with the access device 104, the location data provided by the access device 104 to the portable device 102 in step S156, and the determined distance from the access device 104 determined in step S158. As described above, the server computer 106 may use a private key to decrypt the encrypted data. Upon recovering the original data from the encrypted data, the server computer 106 may compare the original data to expected data. For example, the server computer 106 may compare the name of the merchant associated with the access device 104 in the original data to data that the server computer 106 already has with respect to the merchant to determine whether the original data matches the expected data. In another example, the server computer 106 may compare the location of the merchant provided by the access device 104 to the portable device 102 with an expected location of the merchant based on the server computer's 106 knowledge of the merchant. In some embodiments, the server computer 106 may store a record of whether the original data matched the expected data.

At step S168, after the server computer 106 decrypts the encrypted data to recover the original data and compares the original data to expected data, the server computer 106 may also determine whether the determined distance from the access device 104 determined in step S158, as part of the original data, is below a threshold distance. For example, the server computer 106 may determine whether the determined distance from the access device 104 determined in step S158 is below 100 feet. The purpose of this determination may be to determine whether the portable device 102 is in fact within a reasonable distance from the access device 104, indicating a legitimate transaction and not an attempted fraudulent transaction by a fraudster. While a threshold distance of 100 feet is used in this example, the threshold distance may be any distance as set by the server computer's 106 policy, and may also vary for different merchants. In some embodiments, in addition to determining whether the determined distance from the access device 104 determined in step S158, is below a threshold distance, the server computer 106 may At step S170, after the server computer 106 determines whether the determined distance from the access device 104 determined in step S158 is below the threshold distance, the server computer S170 may transmit an indication to the access device 104 whether or not access to the resource is allowed (e.g., whether or not the transaction is authorized). In addition to the indication to the access device 104 regarding whether or not access to the resource is allowed being based on the determined distance in step S158 being below the threshold distance, the indication may also be based on the comparison on the original data to the expected data in step S166 and on whether the account identifier received by the server computer 106 matches an expected account identifier associated with the user of the portable device 102. For example, the server computer 106 may also verify that the location of the access device 104 (e.g., longitude and latitude coordinates) match expected location coordinates for a merchant associated with the access device 104. Accordingly, the server computer 106 may ensure that the request to access the resource initiated by the portable device 102 is being performed at a legitimate location and within a reasonable distance away from the access device 104. In some embodiments, the indication may also be based on a card verification result (CVR) associated with the transaction.

At step 172, after the access device 104 receives an indication from the server computer 106, whether or not access to the resource is allowed, the access device 104 may allow or deny access to the resource based on the received indication. For example, if the indication indicates that access to the resource is allowed, the access device 104 may proceed with allowing the user of the portable device 102 to checkout with one or more items at a merchant location. Similarly, in another example, if the indication indicates that the access to the resource is not allowed, the access device 104 may not allow the user of the portable device 102 to checkout with one or more items at the merchant location, or may ask the user of the portable device 102 to attempt to check out again. In another example, the access device 104 may allow or disallow the user of the portable device 102 to access a building based on the received indication.

Figure 2B:
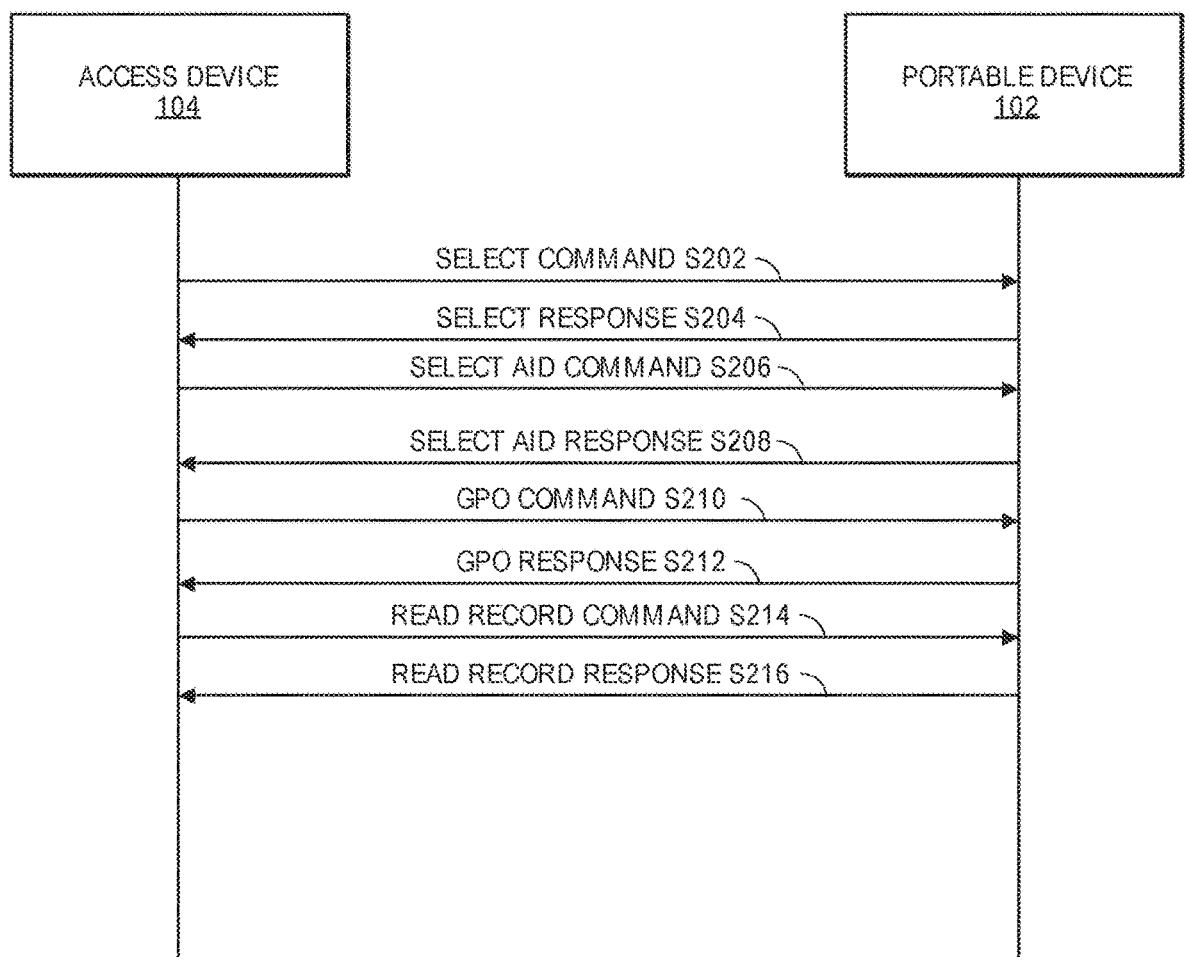
FIG. 2B shows data exchange messages that can occur between a portable device and an access device.

FIG. 2B shows a flow diagram illustrating more detailed interactions between an access device 104 (an example of an first device) and a portable device 102 (an example of a second device) in a payment transaction.

In step S202, when the access device 104 detects a presence of the portable device 102, a select command is sent from the access device 104 to the portable device 102. The select command may be a select PPSE command, which can be used to identify the payment environment supported by the access device 104 and the portable device 102. The command may also include information regarding which payment application(s) (e.g., a list of AID(s)) may be available on the portable device 102

Upon receiving the command in S202, the portable device 102 may include an application which may identify and process the request by recognizing the payment environment identifier (e.g., PPSE name) included in the request, and respond by sending an available applications response S204 back to access device 104. The available applications response S204 may include a list of available AIDs, and may include the payment environment identifier (e.g., PPSE name). In some embodiments, the available applications response S204 may be in the form of a select PPSE response and may include PPSE file control information (FCI).

When the access device 104 receives the available applications response S204, the access device 104 selects a suitable application from the list of applications received in the available applications response S204 (e.g., by selecting an AID from the available AID(s) received in the available application(s) response S204). In some cases, the selected AID can be the highest priority AID available that is supported by access device 104. Access device 104 may send an application selection with the selected AID to the application on the portable device 102. In some embodiments, the application selection can be in the form of a select AID command S206.

Upon receiving the application selection, the application of the portable device 102 may send a terminal transaction data request to request transaction data from access device 104 which may be needed to execute the transaction using the selected application/AID. In some embodiments, the terminal transaction data request may be in the form of a select AID response S208 and may include AID file control information (FCI) with the selected AID as a dedicated file name. The terminal transaction data request may include a list of transaction data identifiers to request the appropriate data from access device 104, and the list of transaction data identifiers can be in the form of a processing options data object list (PDOL). The transaction data requested by the application on the portable device 102 may include terminal transaction qualifiers (TTQ), an authorized amount, other amount, terminal country code, terminal verification results, transaction currency code, transaction data, transaction type, and/or an unpredictable number. The terminal transaction data request may also include other data such as the FCI issuer discretionary data, application program identifier, and language preference.

After receiving the terminal transaction data request, access device 104 may send, to the application of the portable device 102, the terminal transaction data requested by the mobile application. In some embodiments, the terminal transaction data may be sent in the form of a get processing options (GPO) command S210, and may include the requested terminal transaction data in a processing options data object list (PDOL). In some embodiments, the terminal transaction data (e.g., terminal transaction qualifiers (TTQ)) may include a transaction type indicator indicating whether access device 104 supports integrated chip based transactions or magnetic stripe based transactions. Thus, in the chip based transaction illustrated in FIG. 2B, access device 104 may send a transaction type indicator in the terminal transaction data to indicate that access device 104 supports integrated chip based transactions. In some embodiments, the terminal transaction data (e.g., terminal transaction qualifiers (TTQ)) may also include a consumer verification method (CVM) requirement indicator to indicate whether a CVM is required by access device 104, and also CVM type indicators indicating the types of CVM supported by access device 104. Examples of CVMs that may be supported by access device 104 can include online PIN, signature, and/or consumer device CVM (CDCVM) such as a passcode used on portable device 102.

Once the application of the portable device 102 receives terminal transaction data, the application may increment its Application Transaction Counter (ATC), generate dynamic transaction processing information using at least some of the received terminal transaction data, and send a set of transaction processing information including the generated dynamic transaction processing information to access device 104. In some embodiments, the transaction processing information can be sent in the form of a GPO response S212. In some embodiments, the transaction processing information may include one or more application file locators (AFLs) that can be used as file address(es) by access device 104 to read account data stored on portable device 102, and an application interchange profile (AIP) that can be used to indicate the capabilities of the application.

For an integrated chip based transaction, the transaction processing information may include a transaction cryptogram dynamically generated using a LUK (limited use key), track-2 equivalent data, and additional data such as issuer application data (IAD), form factor indicator (FFI), card transaction qualifiers (CTQ), cryptogram information data (CID), the updated ATC, and/or an application PAN sequence number (PSN). In some embodiments, the issuer application data (IAD) may include a length indicator indicating the length of the IAD, cryptogram version number (CVN) indicating the version of the transaction cryptogram, a derived key indicator (DKI) that can be used to identify a master key (e.g. a master key associated with the issuer used in generation of the LUK), card verification results (CVR), a wallet provider ID, and/or derivation data such as the key index that was used in the generation of the LUK.

The card verification results (CVR) may include information about the CVM verifying entity and the CVM verified type for the transaction. The CVM verifying entity is used to indicate which entity is performing the verification of the CVM for the transaction. The verification entity may be the access device (or terminal), a co-residing secure application, a trusted execution environment application, the application on the portable device 102, a remote server (e.g., the cloud), etc. The CVM verified type is used to indicate the CVM method used for the transaction. The CVM method may be a passcode, biometric (e.g., fingerprint), pattern lock (e.g., for a screen lock), signature, or online PIN.

If the terminal transaction data received from access device 104 indicates that the CVM supported by access device 104 is a CDCVM, the CVM verifying entity and the CVM verified type can be set according to the configuration parameters of the account. For example, if the account supports CVM using a passcode that is verified by the operating system of portable device 102, the CVM verifying entity can be set to the operating system, and the CVM verified type can be set to indicate that the CVM is a passcode. In some embodiments, a CDCVM performed indicator can be included in the card transaction qualifiers (CTQ) to indicate whether the CVM verifying entity has successfully verified the user using the CDCVM indicated by the CVM verified type.

If the terminal transaction data received from the access device 104 indicates that a CVM is not required, the CVM verifying entity and the CVM verified type can be set to indicate that no CVM was verified. In some embodiments, the CVR may include additional data such as a threshold indicator that indicates whether one or more limited-use thresholds associated with the LUK have been exceeded.

The form factor indicator (FFI) may include information about portable device 102. The form factor indicator (FFI) may indicate that portable device 102 is a standard card (e.g., ID-1 card type as specified in ISO 7811), a mini-card, a non-card form factor (e.g., key fob, watch, wristband, ring, sticker, etc.), or a mobile phone. The consumer payment device features indicators may indicate whether portable device 102 is capable of using a passcode (can be separate from a PIN that is used during transactions), has a signature panel, has a hologram, has support for card verification values (e.g., CVV2), is capable of two-way messaging to exchange identifying information between the issuer and the user, and/or has support for using cloud-based credentials (e.g., LUK, token, etc.). The form factor indicator (FFI) may also include a payment transaction technology indicator indicating that portable device 102 supports contactless transactions (e.g., NFC).

After the access device 104 receives the transaction processing information, the access device 104 may send an account data request to the application of portable device 102 to read additional account data that may be stored on portable device 102. In some embodiments, the account data request may be in the form of a read record command S214, and may include an application file locator (AFL) indicating the address or location of the account data that access device 104 is attempting to read. The AFL included in the account data request may correspond to an AFL in the transaction processing information provided from portable device 102.

In response to receiving the account data request from access device 104, portable device 102 may send the account data stored at the location indicated by the AFL to access device 104. In some embodiments, the account data may be sent in the Form of a read record response S216. The account data may include, for example, application usage control that indicates the issuer's restrictions on the usage and services allowed for the application, the cardholder's name, customer exclusive data, issuer country code, token requester ID (e.g., if a token is used), and/or other account related data that is accessible at the AFL location.

Once the access device 104 has received the requisite data from the transaction processing information and/or one or more account data transmissions, some or all of the data elements in the transaction processing information and/or one or more account data transmissions can be used by access device 104 to generate a transaction authorization request message to request authorization of the transaction from the issuer. For example, in some embodiments, the transaction authorization request message may include at least the track-2 equivalent data and the transaction cryptogram generated with the LUK, and the transaction can be authorized based on at least verifying that the transaction cryptogram was generated correctly and that the LUK used in generation of the transaction cryptogram has not exhausted the LUK's set of one or more limited use thresholds.

In FIG. 2B, location data for the access device 104 may be sent to the portable device 102 in one or more of the messages in steps S202, S206, S210, and/or S214. Also, the location data for the portable device 102 and/or the distance between the access device 104 and the portable device 102 as determined by the portable device 102 may be sent in one or more the messages in steps S204, S208, S212, and/or S216. It is advantageous to include such location data within these messages, as these messages can be used in typical contactless payment transactions. As such, separate messages need not be created for the transmission of location and/or distance data between the access device 104 and the portable device 102.

FIG. 3 shows a block diagram of multiple users within a merchant store 300, according to some embodiments. The merchant store 300 may be any physical storefront that may provide goods or services to customers. Additionally, the merchant score 300 may include an access device 104 that users within the merchant store 300 may interact with, via their portable device, to initiate a transaction to, for example, checkout and pay for an item offered by the merchant store 300.

The operator of the merchant store 300 may wish to offer customers an option to checkout without having to be very close to the access device 104, as is usually required in traditional NFC transactions. This may provide the advantage of not making customers wait in a queue to be able to use the access device 104 and may also increase the customer experience. For example, a customer may pick out an item from a shelf at the merchant store 300 and initiate the checkout process using his/her portable device at the same location from which the customer grabbed the item. In another example, a customer may initiate the checkout process after grabbing the item and making their way to the exit of the merchant store 300, but prior to leaving the merchant store 300.

In this example, there are three customers within the merchant store 300. The customers include user A 302, user B 304, and user C 306. Each customer may also have their own portable device. For example, user A 302 has portable device 302A, user B 304 has portable device 304A, and user C 306 has portable device 306A.

In accordance with the description provided above, user A 302 may initiate a transaction to checkout for an item offered by the merchant store 300 by using his/her portable device 302A to interact with the access device 104. For example, user A 302 may launch a mobile application on the portable device 302A and the mobile application may scan for available access devices within the merchant store. The mobile application may report that access device 104 was found within the merchant store 300, and user A 302 may select access device 104 as the intended access device to continue to the transaction. The portable device 302A and access device 104 may then establish a wireless link as described with respect to step S152 above.

User A 302 may then scan the item that he wishes to purchase at the merchant store 300 by scanning the item barcode with a camera of the portable 302A, or may scan the item using any other item or barcode scanner offered by the merchant store 300. The portable device 302A may then request data from the access device 104. This data may include data typically requested from an access device 104 during a transaction. For example, the portable device 302A may request a random or unpredictable number, the current time and date, the name of the merchant associated with the access device 104, location coordinates of the access device 104, etc. In turn, the access device 104 may provide the portable device 302A with the requested data. The portable device 302A may then determine its own location using onboard location sensors (e.g., GPS chip). Based on the portable device's 302A own location, and the location of the access device 104 provided by the access device 104, the portable device 302A may determine its distance away from the access device 104. For example, the portable device 302A may determine that it is 175 feet away from the access device 104.

The portable device 302A may then generate encrypted data which includes the determined distance and the data received from the access device 104 in response to the request from the portable device 302A. This encrypted data along with an account identifier may then be sent, by the portable device 302A, to the access device 104 via the wireless link that was established. In turn, the access device 104 may transmit the received encrypted data and account identifier to a server computer. The server computer may then decrypt the encrypted data in accordance with the description above with respect to FIG. 1. In addition to verifying the account identifier and the other data in the encrypted data, the server computer may determine whether the portable device 302A is less than a threshold distance away from the access device 104. For example, the threshold distance may be 200 feet, as set by an operator of the server computer. In this example, since portable device 302A is 175 feet away from the access device 104, the server computer may allow the transaction to proceed because the portable device 302A is less than the threshold distance away from the access device 104.

Similarly, the server computer may also allow transactions involving user B 304 and portable device 304A, and user C 306 and portable device 306A, because the portable devices are 125 feet and 100 feet away, respectively, from the access device 104.

If user D initiates a transaction with access device 104 using portable device 308A, the server computer may deny the transaction. For example, portable device 308A is located outside of the merchant store 300 and at a distance more than the threshold distance (e.g., 200 feet) away from the access device. When this distance information is provided to the server computer, the server computer may deny the transaction because the portable device 308A is located at a distance greater than the threshold distance away from the access device 104. The transaction may be denied because the portable device 308A is not within what may be considered a safe enough distance away from the access device 104, and could potentially be a fraudulent transaction. For example, user D 308 could be a fraudster attempting to perform a relay attack.

By ensuring that a portable device initiating a transaction is within a threshold distance away from the access device 104, any risk of potential fraud associated with the transaction can be greatly reduced as there is some confidence that the portable device is likely within the merchant store 300 itself.

In some embodiments, data regarding the characteristics of the access device 104 may be transmitted to a remote server computer that performs authorization processing. Such characteristics may indicate to the remote server computer the type of access device and its associated capable communication range. For example, if the access device provides data indicating that it has an NFC (near field communications) reader, then the acceptable range of wireless communication may be 20 cm. Any distance determination from the first device to the second device that exceeds this value may be considered potentially fraudulent. In another example, if the access device provides data indicating that is uses Bluetooth, then the acceptable range of wireless communication may be 100 meters. Any the distance determination from the first device to the second device exceeds this value may be considered potentially fraudulent.

Figure 4:
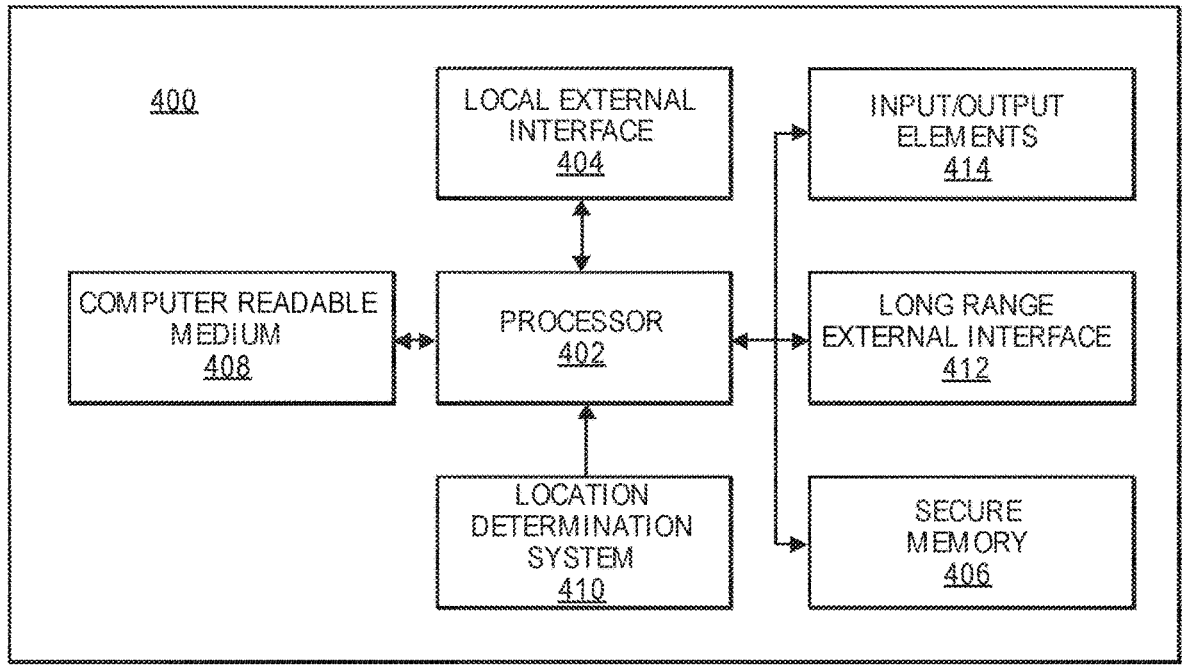
FIG. 4 shows a block diagram of a portable device according to an embodiment of the invention.

FIG. 4 shows a block diagram of a portable device 400 according to an embodiment of the invention. The components of portable device 400 may be used to implement any of portable device 102, portable device 302A, portable device 304A, portable device 306A, and portable device 308A in FIG. 3. The portable device 400 may include a number of components including, but not limited to a processor 402, as well as a secure memory 406, a computer readable medium 408, a location determination system 410, a long range external interface 412, a local external interface 404, and input/output elements 414 that are operatively coupled to the processor 402.

The local external interface 404 may include a contact or contactless element. an exemplary contactless element may include an antenna for transmitting or receiving data from an external device such an access device. An exemplary contact element may include two or more electrical contacts which can allow the portable device 400 to communicate with an external device then the portable device 400 and the external device are in electrical communication through the electrical contacts. The local external interface 404 may include hardware for allowing the portable device 400 to communicate through NFC, Bluetooth, Wi-Fi, infrared, etc.

The long range external interface 404 may include an antenna that may allow the portable device 400 to communicate with a remote server computer, over the air.

The secure memory 406 may store credentials. Credentials may include account identifiers, access data for accessing secure locations, etc. The secure memory 405 may include one or more computer chips or other storage device, capable of storing data in a secure manner.

The location determination system 410 may include any suitable hardware for determining a location of the portable device 400. An example of a location determination system may include a GPS module that can determine a GPS location of the portable device 400.

The input/output elements 414 may include any suitable devices that allow the portable device 400 to receive or provide data. For example, input elements may include keyboards, operational buttons, motion detectors, microphones, etc. Output elements may include speakers, display screens, vibrational devices, etc.

The computer readable medium 408 may comprise code, executable by the processor 402, to implement a method comprising: establishing a wireless connection to a second device; transmitting a request, to the second device, for location data indicative of a location of the second device; receiving, from the second device, the location data indicative of the location of the second device; determining a distance between the first device and the second device based at least in part on the received location data; generating an encrypted value comprising the received location data and the determined distance; and transmitting, to the second device, the encrypted value and an account identifier associated with a user of the first device. The second device transmits the encrypted value and the account identifier to a server computer, and the server computer decrypts the encrypted value to obtain the location data and the determined distance, and allows access to a resource if the determined distance is below a predetermined threshold distance or denies access to the resource if the determined distance is above the predetermined threshold distance.

In some embodiments, the computer readable medium 408 may comprise software modules including a distance determination module including code for determining a distance between a location obtained from the location determination system 410 and a location obtained from an access device. The computer readable medium 408 may also include an interaction module for allowing the portable device 400 to interact with an access device. Further, the computer readable medium 408 may include various access applications such as payment applications, wallet applications, etc.

Figure 5:
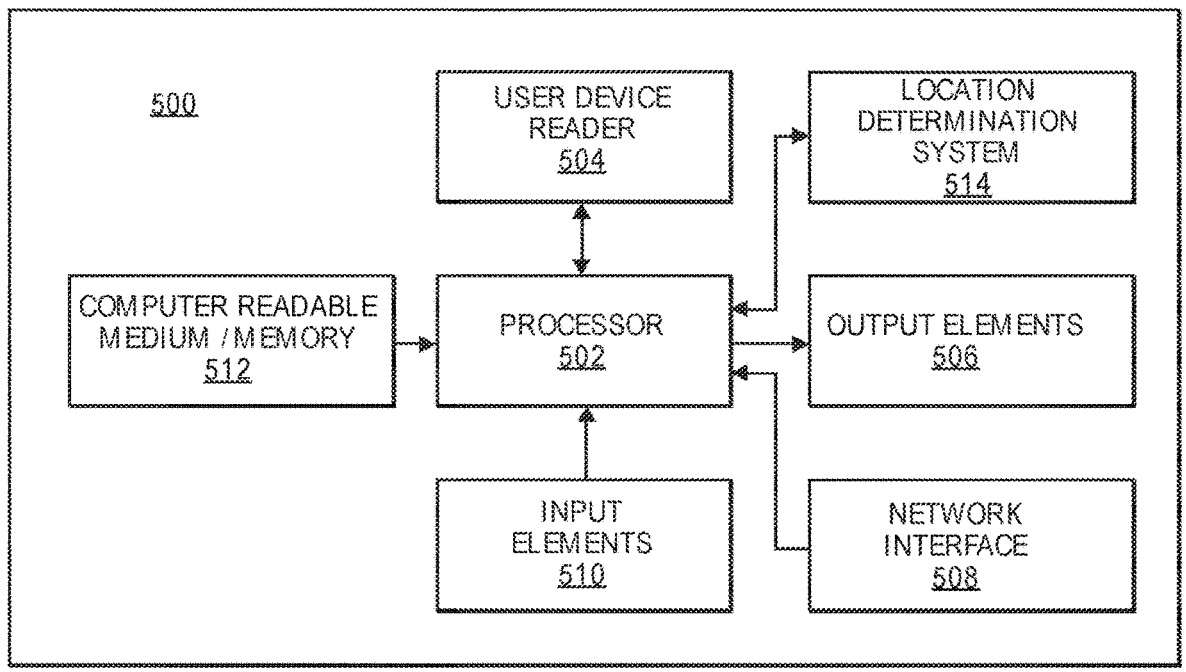
FIG. 5 shows a block diagram of an access device according to an embodiment of the invention.

FIG. 5 shows a block diagram of an access device 500 according to an embodiment of the invention. The components of access device 500 may be used to implement access device 104. The access device 500 may comprise a processor 502. A portable device reader 504, output elements 506, a network interface 508, input elements 510, a location determination system 514, and a computer readable medium/memory 512 may be operatively coupled to the processor 502.

The portable device reader 504 may comprise any suitable device capable of reading, providing, or writing data to or from a portable device. Suitable portable device readers include antennas, electrical contacts, etc. In some embodiments, the portable device reader 504 may include an NFC reader or other type of wireless communication interface. The wireless communication interface may communicate with a portable device using Bluetooth, Wi-Fi, infrared signals, optical signals, etc.

Output elements 506 may comprise any suitable devices that may output data. Examples of output elements 506 may include display screens, speakers, and data transmission devices.

The network interface 508 may include an interface that can allow the access device 500 to communicate with external computers.

The input elements 510 may include any suitable device capable of inputting data into the access device 500. Examples of input devices include buttons, touchscreens, touch pads, microphones, etc.

The computer readable medium/memory 512 may comprise one or more data storage devices. Such data storage devices may store code or applications which can cause the access device 500 to perform the functions described herein. For example, the access device 500 may include an authorization request and response module, which can include code for generating and transmitting authorization request messages, and code for receiving and processing authorization response messages. It may also include a portable device interaction module including code for allowing the access device 500 to interact with a portable device.

The location determination system 514 may include any suitable hardware for determining a location of the portable device access device 500. An example of a location determination system may include a GPS module that can determine a GPS location of the access device 500. In other embodiments, the access device 500 need not have a location determination system 514. In such embodiments, the location coordinates for the access device 500 can simply be programmed into the access device 500 if the access device 500 is essentially in a fixed position.

Figure 6:
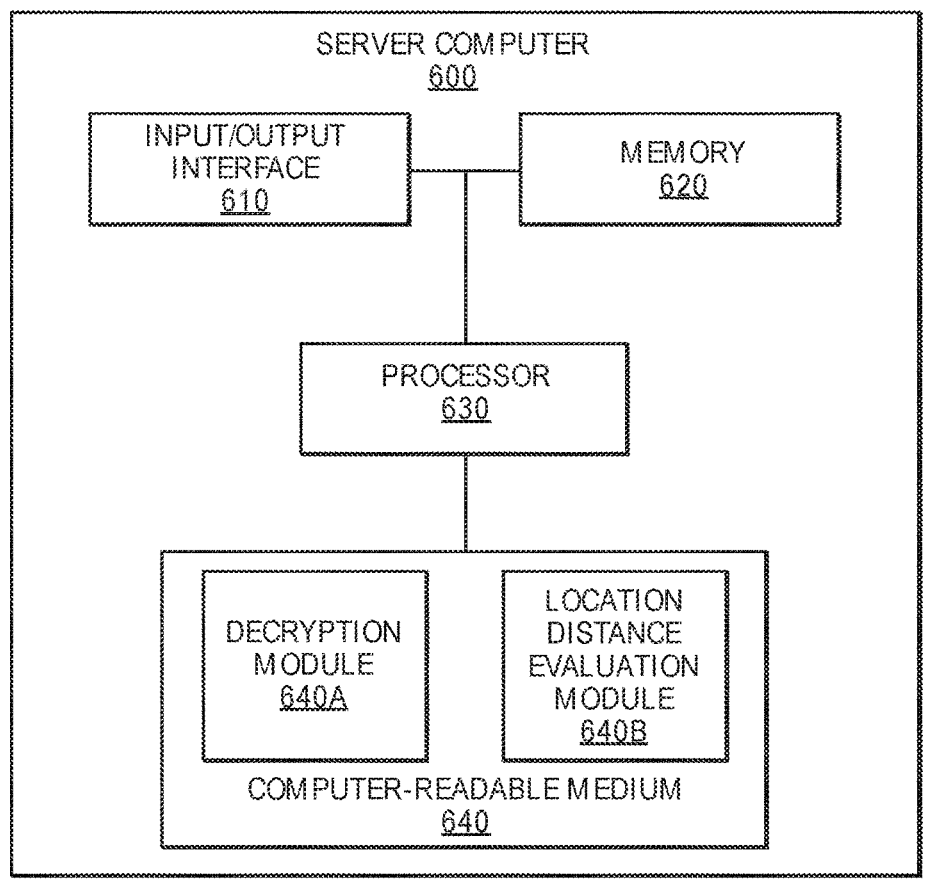
FIG. 6 shows a block diagram of an server computer according to an embodiment of the invention.

FIG. 6 shows a block diagram of a server computer 600 according to an embodiment of the invention. The components of server computer 600 may be used to implement server computer 106. The server computer 600 includes an input/output interface 610, a memory 620, a processor 630, and a non-transitory computer-readable medium 640. In some embodiments, server computer 600 may reside within a payment processing network cloud.

The input/output (I/O) interface 610 is configured to receive and transmit data from external devices or apparatuses. For example, the I/O interface 610 may receive an authorization request and may obtain activity related data associated with a user over a communication channel. The I/O interface 610 may also be used for direct interaction with the server computer 600. The server computer 600 may accept input from an input device such as, but not limited to, a keyboard, keypad, or mouse. Further, the I/O interface 610 may display output on a display device.

Memory 620 may be any magnetic, electronic, or optical memory. It can be appreciated that memory 620 may include any number of memory modules. An example of memory 620 may be dynamic random access memory (DRAM).

Processor 630 may be any general-purpose processor operable to carry out instructions on the server computer 600. The processor 630 is coupled to other units of the server computer 600 including input/output interface 610, memory 620, and computer-readable medium 60.

Computer-readable medium 640 may be any magnetic, electronic, optical, or other computer memory device. In some embodiments, the computer readable medium 640 may comprise code, executable by the processor 630 for implementing a method comprising: receiving, from a first device, an encrypted value and an account identifier associated with a user of a second device, wherein the encrypted value is generated by the second device, and wherein the encrypted value comprises location data indicative of a location of the first device and a distance between the first device and the second device determined by the second device; decrypting the encrypted value to obtain the location data and the distance; and if the distance is below a predetermined threshold distance, then allowing access to a resource, otherwise if the distance is above a predetermined threshold distance, denying access to the resource.

In FIG. 6, a decryption module 640A is illustrated on the computer readable medium 640. The decryption module 640A may comprise software that can utilize decryption keys to decrypt any data packets including encrypted data that might be received by the server computer 600.

In FIG. 6, a location distance evaluation module 640B is also illustrated. The long distance evaluation module may contain code for determining if a distance between a first device and a second device that is received in an authorization request message is within a predetermined threshold distance. The predetermined threshold distance may be a set value (e.g., 100 meters), or may vary depending upon the type of first device or access device that is interacting with the second device or portable device. As noted above, in some embodiments, data regarding the communication characteristics of the first device and/or second device could be included in an authorization request message. The acceptable threshold distance may change depending upon the type of first and/or second device that is used.

Figure 7:
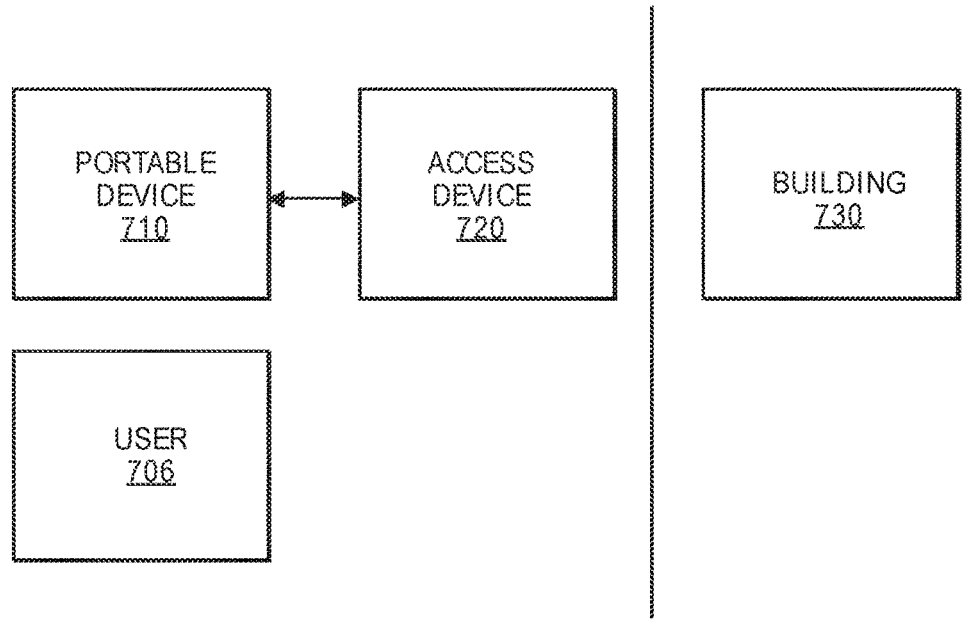
FIG. 7 shows a block diagram of a building access system according to an embodiment of the invention.
Figure 8:
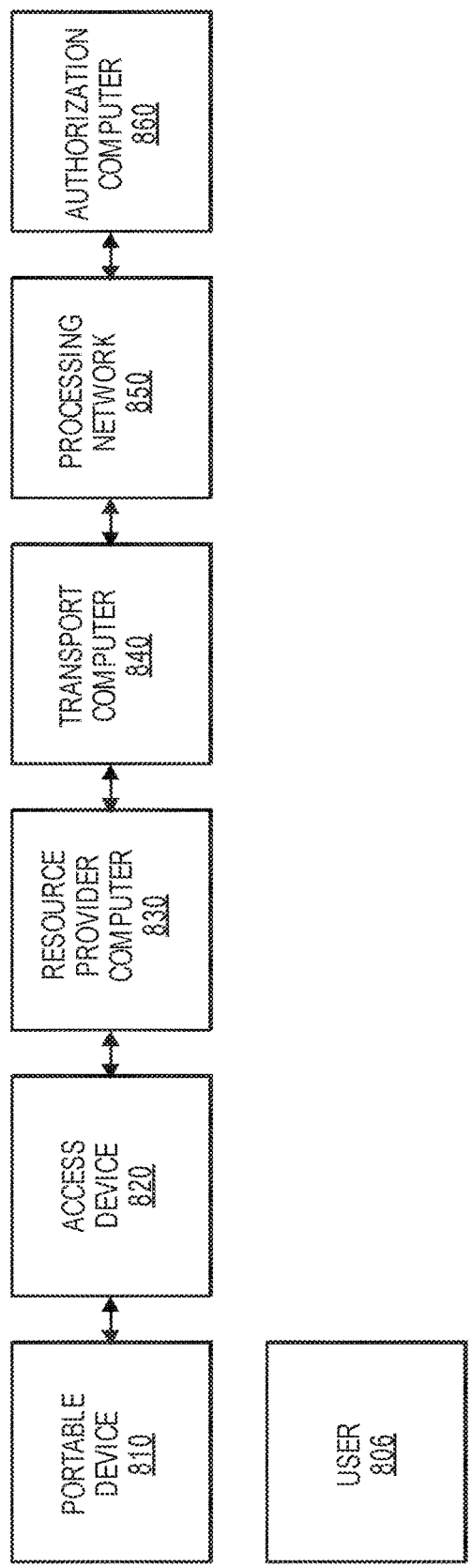
FIG. 8 shows a block diagram of a transaction processing system that can use a portable device with access data according to an embodiment of the invention.

FIGS. 7-8 illustrate different situations illustrating the use of a portable device with an access device when attempts are made to access resources such as goods, services, or locations.

FIG. 7 shows a block diagram of a building access system. FIG. 7 shows a portable device 710 operated by a user 706. The portable device 710 can interact with the access device 720 and pass access data to the access device 720. The access device 720 may locally verify the received access data or it may communicate with a remotely located authentication server computer (not shown). The remotely located authentication server computer may verify that the access data is authentic and may transmit a signal indicating this back to the access device 720. The access device 720 may then proceed to let the user 706 enter the building 730. For example, the access device 720 may allow the user 706 to enter the building 730 if the portable device 710 is within a threshold distance away from the access device 720 (e.g., within 10 feet).

FIG. 8 shows a block diagram of a transaction processing system that can use a portable device with access data. FIG. 8 shows a user 806 that can operate a portable device 810. The user 806 may use the portable device 810 to pay for a good or service at a resource provider such as a merchant. The resource provider may operate a resource provider computer 830 and/or an access device 820. The resource provider may communicate with an authorization computer 860 (e.g., an issuer computer) via a transport computer 830 (e.g., an acquirer computer) and a processing network 850 (e.g., a payment processing network).

The processing network 850 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a portable device 810 at an access device 820 (e.g. POS location) can be described as follows. A user 806 presents his or her portable device 810 to an access device 820 to pay for an item or service. The portable device 810 and the access device 820 interact such that access data from the portable device 810 (e.g. PAN, a payment token, verification value (s), expiration date, etc.) is received by the access device 820 (e.g. via contact or contactless interface). The resource provider computer 830 may then receive this information from the access device 820 via an external communication interface. The resource provider computer 830 may then generate an authorization request message that includes the information received from the access device 820 (i.e. information corresponding to the portable device 810) along with additional transaction information (e.g. a transaction amount, merchant specific information, etc.) and electronically transmits this information to a transport computer 840. The transport computer 840 may then receive, process, and forward the authorization request message to a processing network 850 for authorization.

In general, prior to the occurrence of a credit or debit-card transaction, the processing network 850 has an established protocol with each authorization computer on how the issuer's transactions are to be authorized. In some cases, such as when the transaction amount is below a threshold value, the processing network 850 may be configured to authorize the transaction based on information that it has about the user's account without generating and transmitting an authorization request message to the authorization computer 860. In other cases, such as when the transaction amount is above a threshold value, the processing network 850 may receive the authorization request message, determine the issuer associated with the portable device 810, and forward the authorization request message for the transaction to the authorization computer 860 for verification and authorization. Once the transaction is authorized, the authorization computer 860 may generate an authorization response message (that may include an authorization code indicating the transaction is approved or declined) and transmit this electronic message via its external communication interface to processing network 850. The processing network 850 may then forward the authorization response message to the transport computer 840, which in turn may then transmit the electronic message to comprising the authorization indication to the resource provider computer 830, and then to the access device 820.

At the end of the day or at some other suitable time interval, a clearing and settlement process between the resource provider computer 830, the transport computer 840, the processing network 850, and the authorization computer 860 may be performed on the transaction.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software. Any of the above mentioned entities may operate a computer that is programmed to perform the functions described herein.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method, comprising:
    establishing, by a first device, a wireless connection to a second device, wherein the first device is a client device and the second device is an access device at a location of a merchant;
    transmitting a request, by the first device and to the second device, for location data indicative of a location of the second device;
    receiving, by the first device and from the second device, the location data indicative of the location of the second device;
    determining, by the first device, a distance between the first device and the second device based at least in part on the location data received from the second device that is indicative of the location of the second device;
    determining, by the first device, a risk score based on the determined distance;
    generating, by the first device, an encrypted value based on the received location data, the determined distance, and the determined risk score;
    transmitting, by the first device and to the second device, the encrypted value that is a payment token associated with a user of the first device, wherein the second device transmits the encrypted value and the payment token received from the first device to a server computer, wherein the server computer decrypts the encrypted value received from the second device to obtain the location data, the distance data and the risk score, and wherein the server computer sends a notification to the access device to allow the client device to access a resource after analyzing the decrypted value; and
    receiving, by the first device from the second device, a notification to access the resource.

2. The method of claim 1, wherein the wireless connection is at least one of a Bluetooth Low Energy (BLE), Near Field Communication (NFC), or Wi-Fi connection.

3. The method of claim 1, wherein the first device is a portable device.

4. The method of claim 3, wherein the portable device is a mobile phone and the access device is a point of sale (POS) device.

5. The method of claim 1, wherein the method further comprises, in response to establishing the wireless connection to the second device, receiving, by the first device and from the second device, an unpredictable number, and wherein the generated encrypted value is further based on the unpredictable number.

6. The method of claim 1, wherein the location data comprises latitude and longitude data.

7. The method of claim 1, wherein the encrypted value is a hashed value.

8. The method of claim 1, wherein the distance is a straight line distance.

9. The method according to claim 1, wherein the located data is encrypted using a public key, and wherein the server computer analyzes the encrypted value by decrypting the encrypted value using a private key corresponding to the public key.

10. The method according to claim 1, wherein the second device transmits access device characteristics to the server computer, wherein the access device characteristics include a communication range associated with the access device, and wherein the analyzing, by the server computer, the decrypted value includes determining the communication range associated with the access device.

11. The method according to claim 1, wherein the payment token is primary account number (PAN).

12. A first device, the first device comprising:
    a processor; and
    a non-transitory computer readable medium, the non-transitory computer readable medium comprising computer executable code for executing a method, the method comprising:
    establishing a wireless connection to a second device, wherein the first device is a client device and the second device is an access device at a location of a merchant;
    transmitting a request, to the second device, for location data indicative of a location of the second device;
    receiving, from the second device, the location data indicative of the location of the second device;
    determining a distance between the first device and the second device based at least in part on the location data received from the second device that is indicative of the location of the second device;
    determining a risk score based on the determined distance;
    generating an encrypted value based on the received location data, the determined distance, and the determined risk score;
    transmitting, to the second device, the encrypted value that is a payment token associated with a user of the first device, wherein the second device transmits the encrypted value and the payment token received from the first device to a server computer, wherein the server computer decrypts the encrypted value received from the second device to obtain the location data, the distance data, and the risk score, and wherein the server computer sends a notification to the access device to allow the client device to access a resource after analyzing the decrypted value; and receiving, by the first device from the second device, a notification to access the resource.

13. The first device of claim 12, wherein the wireless connection is at least one of a Bluetooth Low Energy (BLE), Near Field Communication (NFC), or Wi-Fi connection.

14. The first device of claim 12, wherein the method further comprises, in response to establishing the wireless connection to the second device, receiving, by the first device and from the second device, an unpredictable number, and wherein the generated encrypted value is further based on the unpredictable number.

15. The first device of claim 12, wherein the encrypted value is a hashed value.

16. A method, comprising:
receiving, by a server computer and from a first device, an encrypted value and a payment token associated with a user of a second device;
wherein the encrypted value is generated by the second device based on location data received from the first device, a determined distance between the first device and the second device based at least in part on the location data received from the first device, and a risk score determined based on the determined distance,
wherein the second device is a client device and the first device is an access device at a location of a merchant;
decrypting, by the server computer, the encrypted value received from the first device to obtain the location data, the distance data, and the risk score;
allowing, by the server computer, access to a resource after decrypting the encrypted value after determining that the location data, the distance data and the risk score are in a predetermined range; and
sending, by the server computer, a notification to the access device to allow the client device to access the resource.

17. The method of claim 16, wherein the encrypted value is a hashed value.

* * * * *